C. HERENDEEN.
METHOD OF TREATING FLOUR.
APPLICATION FILED JUNE 28, 1913.

1,073,985.

Patented Sept. 23, 1913.
3 SHEETS—SHEET 1.

C. HERENDEEN.
METHOD OF TREATING FLOUR.
APPLICATION FILED JUNE 28, 1913.

1,073,985.

Patented Sept. 23, 1913.

3 SHEETS—SHEET 3.

Witnesses:

Inventor:
Charles Herendeen,
By Browne & Phelps
Attys.

UNITED STATES PATENT OFFICE.

CHARLES HERENDEEN, OF CHICAGO, ILLINOIS.

METHOD OF TREATING FLOUR.

1,073,985. Specification of Letters Patent. Patented Sept. 23, 1913.

Application filed June 28, 1913. Serial No. 776,305.

*To all whom it may concern:*

Be it known that I, CHARLES HERENDEEN, a citizen of the United States, residing at Chicago, in the county of Cook and State of Illinois, have invented a new and useful Improvement in Methods of Treating Flour, of which the following is a specification.

My invention relates to an improved process for the treatment of flour by means of which ordinary commercial flour, whether made from wheat, rye or other cereal having a high starch content may be so treated as to disrupt the starch cells therein, whereby the nutritive value of the flour will be increased, due to the fact that it is easier to digest, besides giving it a greater capacity for absorbing moisture than ordinary flour possesses, whereby bread, pastry and other food products made from such flour will remain fresh for a longer time than those made from flour which has not been treated in accordance with my invention.

With the foregoing and other objects in view my invention consists broadly in a method of treating flour by temporarily suspending the same in a finely divided condition in the atmosphere, and injecting into the flour, while in suspension, steam, and immediately thereafter, heating the flour to a sufficient temperature to disrupt the starch cells and dry the flour.

My invention consists further in the method of treating flour by permitting the flour to fall freely in the form of a finely divided shower, injecting steam into the falling shower, and immediately thereafter heating the flour to a sufficient temperature to disrupt the starch cells and dry the same.
My invention further consists in certain steps which will be first described in connection with the accompanying drawings wherein I show one form of machine capable of carrying out my process, and then the invention will be particularly pointed out in the appended claims.

Figure 1:
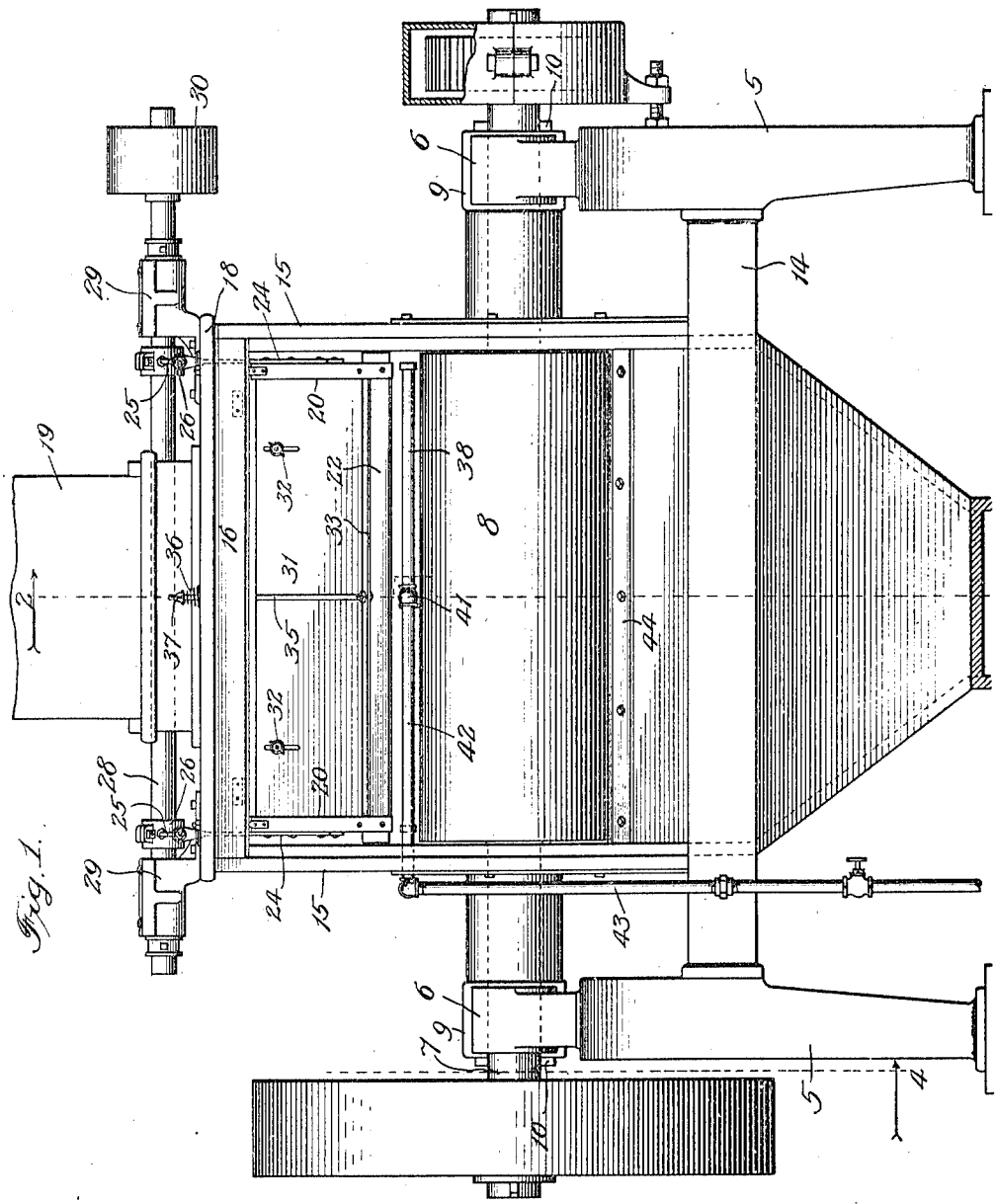
Figure 2:
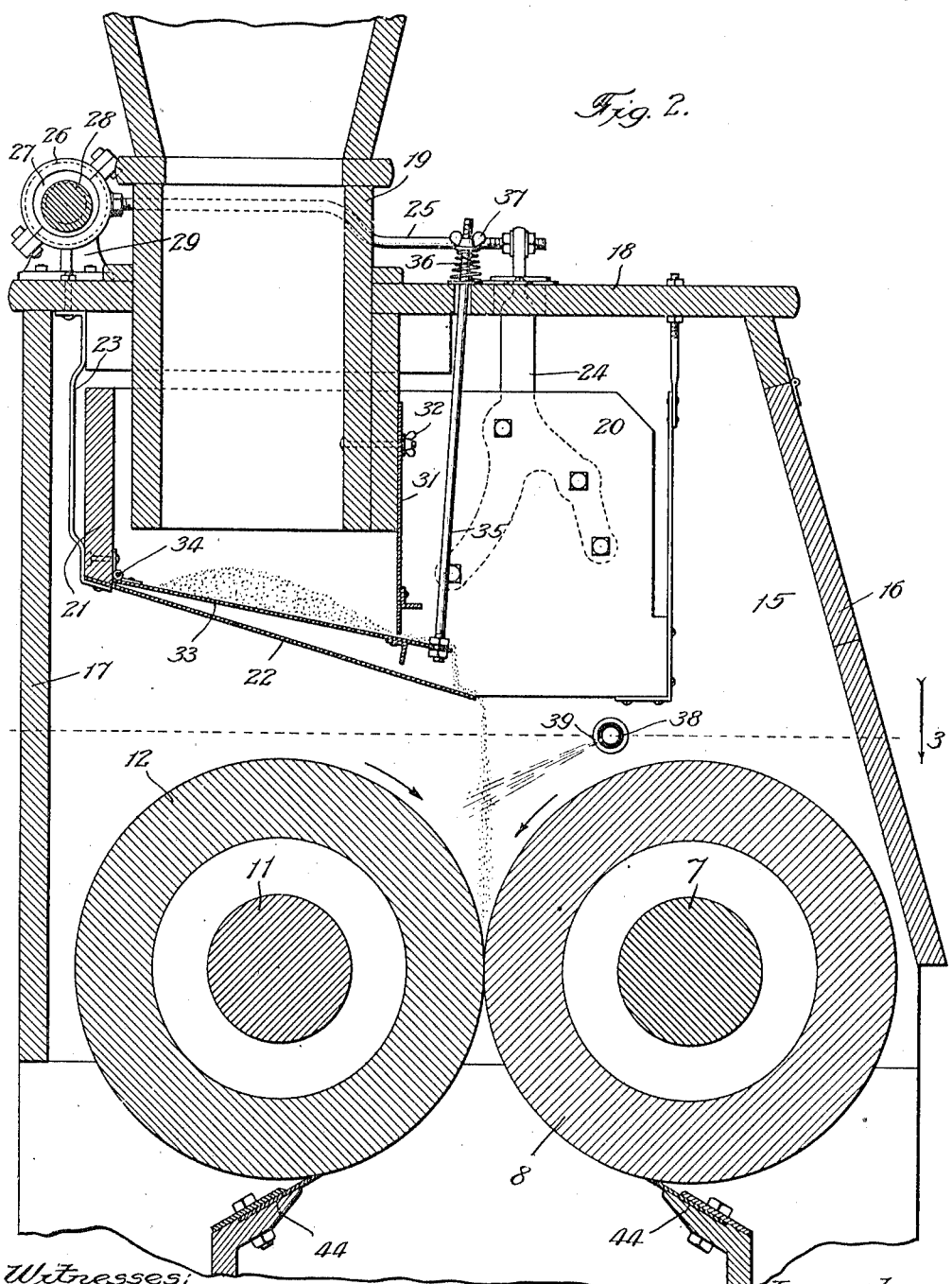
Figure 3:
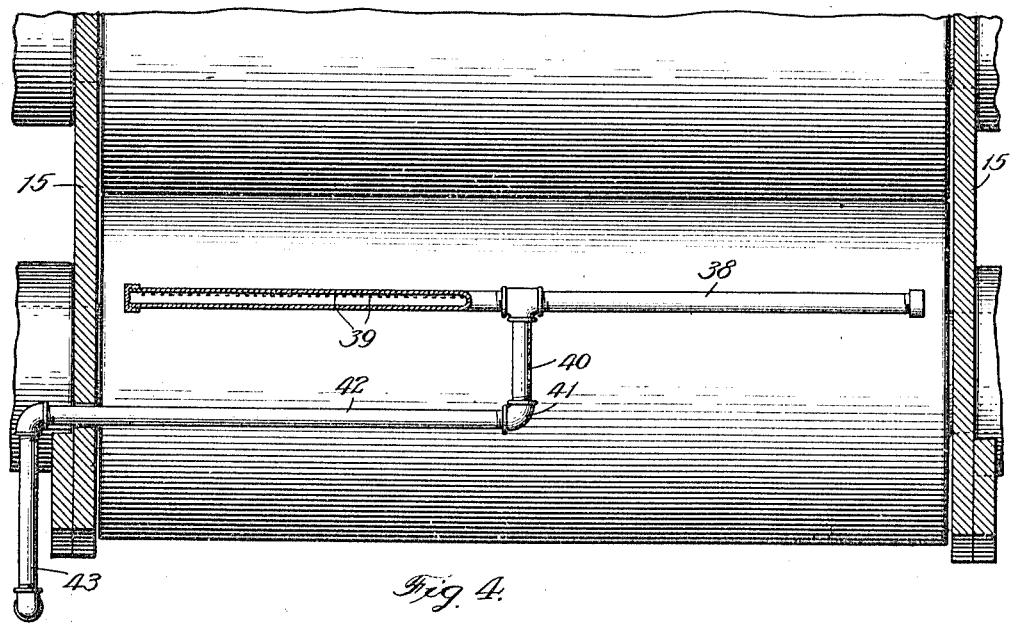
Figure 4:
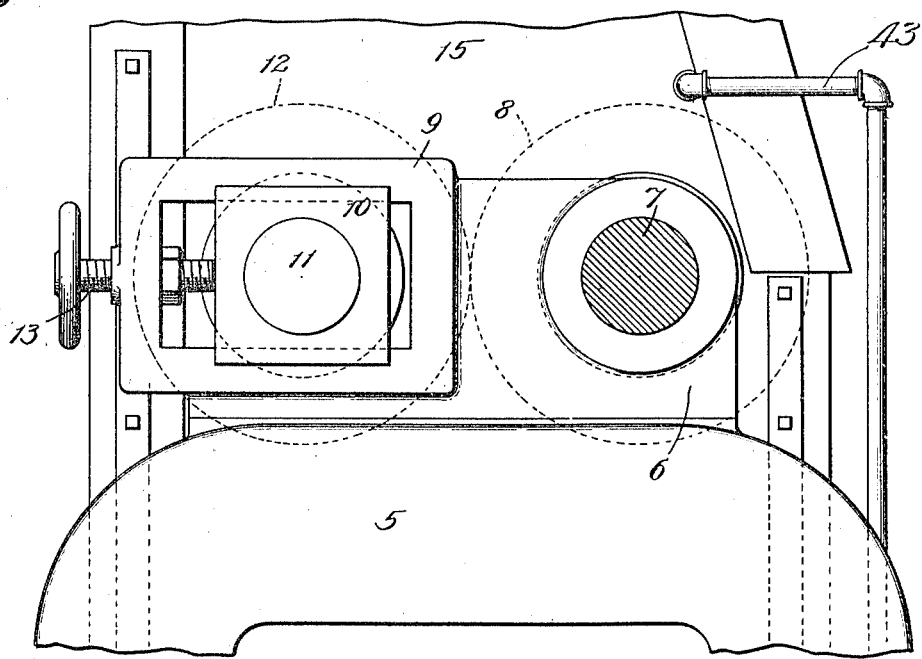

Referring to the drawings herein designated, Figure 1 is a front elevation of machine embodying my invention; Fig. 2 is a central, vertical section taken on line 2 in Fig. 1 and looking in the direction of the arrow; Fig. 3 a section taken on line 3 of Fig. 2 and locking in the direction of the arrow and Fig. 4 is a section taken on line 4 of Fig. 1 and looking in the direction of the arrow.

5 designates a suitable supporting-frame provided in its upper portion with bearings 6 for the shaft 7 of one of the flaking rolls 8. I have also shown the upper portion of the frame as being provided with a yoke 7 in which is mounted a sliding journal-box 10 for the shaft 11 of the other flaking roll 12. 13 indicates a set-screw bearing against the box 10, whereby the roll 12 may be adjusted into the desired contact with roll 8. The particular construction of these parts forms no part of my invention, and may be varied or changed as desired.

Supported on the cross-bar 14 of the frame 5 are the side plates 15 of a box or casing, and 16 and 17 are the front and rear plates of said casing, the casing extending over and inclosing the flaking rolls 8 and 12, as best shown in Fig. 2. The box is also shown as provided with a top or cover 18 into which extends the pipe 19, through which the flour to be treated is fed. The pipe 19 fits into any ordinary or desired form of shaker which is adapted to separate the flour into particles and to deliver the same between the rolls 8 and 12 in the form of a finely divided shower. I have illustrated one form of well-known shaker, though the particular construction thereof forms no part of my invention. The shaker shown comprises side plates 20, a rear plate 21 and an inclined bottom plate 22. This shaker is supported at its rear by a spring arm 23 connected to the back plate 21 at one end, and to the under side of the top 18 at the other. Secured to the side plates 20 are brackets 24, which extend up through openings in cover and are connected to rods 25, connected to eccentric straps 26, surrounding eccentrics 27, mounted on a shaft 28, supported in suitable bearings 29 on the cover 18. I have also shown the shaft 28 as provided with a pulley 30 for driving the same.

I have illustrated a plate 31 adjustably mounted on the front of the pipe 19 by the set-screws 32; the lower end of the plate extending down below the mouth of the pipe. 33 is a plate hinged at 34 to the rear plate 21 of the casing, said plate extending forwardly and its front end being supported by a rod 35 extending upwardly through the top 18, the upper end of the rod being surrounded by the coil-spring 36, over which is adjustably secured the thumb-nut 37.

The just described mechanism is a form of shaker well-known in the art, and it will be seen that flour dumped into the tube 19 will pass out onto the plate 33, thence beneath the lower edge of the plate 31 onto the incline shaker plate 22 and from thence in a fine shower down between the flaking rolls 8 and 12.

In the particular machine illustrated, for the purpose of carrying out my invention, I provide a steam-pipe 38 perforated on one side with a line of perforations 39 in such a position as to inject a line of steam the length of the shower of flour into the shower just before the flour passes between the flaking rolls 8 and 12. The flaking rolls 8 and 12 may be heated to a temperature sufficient to thoroughly dry the flour passing between them by any desired means. I have found, however, that for some reason, not necessary to be stated, that when the rolls are jacked together very tightly, as is necessary, that sufficient heat is generated in the rolls and a sufficiently high temperature maintained to produce the necessary effects. The effect of injecting the steam into the falling shower of flour and then immediately passing the flour between these tightly pressed heated rolls is not only to dry out the flour, but to produce the result I desire, namely, to disrupt the starch cells in each particle of the flour.

I have shown the pipe 38 as extending out from a pipe 40 connected to the central portion of the pipe 38, and the pipe 40 being connected by an elbow 41 to a length of pipe 32, extending parallel to the pipe 38 and through the side 15 of the box, and then connected by pipe 43 to a suitable source of steam supply. It will also be noted, that with the pipe arranged as shown, that the openings 39 therein cause the steam therein to be directed into the shower of flour in a downward, diagonal direction. This, however, can be changed as desired. I have also illustrated a pair of scrapers 44 which are attached to scrape the flaked flour from the rolls 8 and 12.

The flour, after it has been subjected to the steam and passed through the heated flaking rolls comes out in very thin sheets or flakes. These sheets can be collected in any suitable or desired way and then subjected to the full roller process, whereby they will be ground into flour of the original fineness; but said flour has its starch-cells disrupted and consequently when bread, pastry or the like is made therefrom, the said food will be more readily digestible, and because the flour with the disrupted starch-cells will absorb a greater amount of moisture than ordinary flour, the amount of moisture in the bread or pastry can be increased and thus the time which said bread or pastry can be kept without becoming stale is lengthened.

While I have described one specific manner of carrying out my improved process, I desire to have it understood that many changes may be made without departing from the spirit of my invention, and by having described one specific manner, in detail, of carrying out my invention, I do not intend to be limited thereto, except as pointed out in the following claims, in which it is my intention to set forth all the novelty inherent in the construction set forth in my invention.

What I claim as new and desire to secure by Letters Patent is:—

1. The method of treating flour which consists in separating the flour into its particles and treating the flour while in this condition to the action of moisture, heat and pressure.

2. The method of treating flour which consists in separating the flour into its particles, and treating the flour while in this condition first to the action of steam and then to subjecting it to pressure.

3. The method of treating flour which consists in temporarily suspending the same in a finely divided condition, subjecting the flour while in this condition to the action of heat and moisture and thereafter subjecting it to pressure.

4. The method of treating flour which consists in temporarily suspending the same in a finely divided condition, subjecting the flour while in this condition to the action of steam, and thereafter subjecting it to pressure.

5. The method of treating flour which consists in permitting the flour to fall freely in a finely divided shower, injecting steam into the shower and thereafter heating and drying the same under pressure.

6. The method of treating flour which consists in finely dividing the flour and then permitting it to fall in its finely divided condition, injecting steam into the falling flour, and thereafter heating and drying the same under pressure.

7. The method of treating flour which consists in permitting flour to fall freely in a finely divided shower between a tightly pressed pair of rolls heated to a suitable temperature and injecting steam into said shower.

8. The method of treating flour which consists in temporarily suspending the same in a finely divided condition in the atmosphere, injecting steam into the suspended particles. and thereafter heating the same under pressure.

In testimony whereof I have hereunto set my hand.

CHARLES HERENDEEN.

In presence of two subscribed witnesses:
FRANCIS M PHELPS,
GEORGE J. IRVINE.